United States Patent [19]

Leprince et al.

[11] Patent Number: 4,611,108
[45] Date of Patent: Sep. 9, 1986

[54] PLASMA TORCHES

[75] Inventors: Philippe Leprince; Emile Bloyet, both of Gif sur Yvette; Jean Marec, Limours, all of France

[73] Assignee: Agence National de Valorisation de la Recherche (ANUAR), Paris, France

[21] Appl. No.: 531,346

[22] Filed: Sep. 12, 1983

[30] Foreign Application Priority Data

Sep. 16, 1982 [FR] France ................. 82 15682

[51] Int. Cl.⁴ ............................... B23K 9/00
[52] U.S. Cl. ................. 219/121 PR; 219/10.55 R; 219/121 PM; 219/121 PQ; 315/111.21; 313/231.31
[58] Field of Search ...... 219/121 P, 121 PR, 121 PY, 219/121 PQ, 121 PM, 10.55 R; 204/164; 315/111.21, 111.51; 313/231.31, 231.41, 231.51

[56] References Cited

U.S. PATENT DOCUMENTS

| 3,588,594 | 6/1971 | Yamamoto et al. | 315/111 |
| 4,207,452 | 6/1980 | Arai | 219/10.55 R |
| 4,230,448 | 10/1980 | Ward et al. | 219/10.55 R |
| 4,473,736 | 9/1984 | Bloyet et al. | 219/121 PR |

FOREIGN PATENT DOCUMENTS

| 0019549 | 11/1980 | European Pat. Off. |
| 2336050 | 6/1975 | Fed. Rep. of Germany |
| 2480552 | 4/1981 | France |
| 2473833 | 7/1981 | France |

OTHER PUBLICATIONS

Swift et al., A Microwave Plasma Torch, Mar. 1966, Electronic Engineering, vol. 38, No. 457, London, England, pp. 152–154.

Primary Examiner—M. H. Paschall
Attorney, Agent, or Firm—Kane, Dalsimer, Kane, Sullivan and Kurucz

[57] ABSTRACT

In an improved plasma torch, a metal tube delivers a plasma-generating gas to an end discharge outlet. The delivery tube is excited by microwave energy by means of a waveguide of rectangular cross-section. The tube traverses the waveguide through openings of larger diameter than the delivery tube. Metal sleeves are advantageously provided around the tube on each side of the waveguide. Two gases can be delivered to the plasma within concentric tubes. The plasma-formation zone can be moved further away from the waveguide by providing lateral impedance-matching devices along the sleeve.

24 Claims, 8 Drawing Figures

PLASMA TORCHES

This invention relates to plasma generators and in particular to devices in which a plasma is produced at the end of a tube provided with a discharge outlet and in which a gas is circulated.

In French Pat. No. 2 480 552 (U.S. application Ser. No. 4,473,736, there has already been disclosed a plasma generator comprising a metal tube of relatively small diameter for the circulation of a gas such as argon, for example. The tube is provided at one end with a gas discharge outlet. Said tube is formed either wholly or partly of conductive material in order to maintain a plasma immediately at the point of emergence from the outlet orifice when the tube is supplied with microwave energy.

In the known device, the energy derived from a microwave source is transmitted by means of a coaxial cable to a coupling device or tube excitation structure. In one design, a structure of this type comprises a first sleeve placed around the gas flow tube and surrounded by a second sleeve of substantially larger diameter which is closed at the rear end, both sleeves being of metal. The gas flow tube projects outwards from the excitation structure at the center of an opening formed at the front end of the second sleeve. The inner sleeve of smaller diameter is connected to the core or central conductor of the coaxial cable whilst the other sleeve is connected to the outer conductor of the cable.

A device of the type outlined in the foregoing serves to transfer microwave power to the gas flow tube, especially at frequencies which can attain 100 MHz and exceed several GHz up to a level in the vicinity of one kilowatt. The impedances of the tube and of the excitation structure are matched in such a manner as to ensure that, when no gas is present within the tube, the front end of said tube performs the function of an antenna or, in other words, dissipates in the form of electromagnetic radiation a large part or even practically all of the microwave energy which is applied to the tube.

When a gas is introduced into the rear end of the tube and discharged through the front orifice of tnis latter, the electromagnetic energy in the gaseous medium which immediately surrounds the tube outlet is sufficient to maintain a plasma within said zone after initiation by any suitable triggering means. It has been demonstrated by experience that, under these conditions, radiating emissions from the tube end disappear almost completely. Practically the entire microwave energy transferred to the tube end is expended for the formation of the plasma. The device thus obtained has excellent efficiency.

The invention is primarily directed to improvements in plasma-generating devices of the type recalled in the foregoing. These improvements are intended in particular to extend the range of utilization power and to achieve operational versatility of the device.

According to a first aspect of the invention, there is provided a plasma torch of the type comprising means for supplying microwave energy, gas delivery means comprising at least one gas flow tube having an end portion which is electrically conductive at least to a partial extent and provided with a gas discharge outlet, and means providing a coupling between said supply means and said gas delivery tube, said torch being distinguished by the fact that the microwave supply means comprise a waveguide.

In accordance with one embodiment of this aspect of the invention, the tube passes through at least one waveguide side-wall preferably located nearest the gas discharge outlet through an opening having a transverse dimension which is larger than that of the tube. In one form of construction, the tube passes through the waveguide from one side to the other and transversely with respect to the direction of propagation of energy along said waveguide.

By virtue of this aspect of the invention, it has proved feasible to transmit to a plasma generator of the radiating tube type extremely high microwave powers which can exceed five kilowatts and even attain several tens of kilowatts, this result being achieved by means of structures which are remarkable for their simplicity.

In particular, such results can be achieved by making use of a rectangular waveguide of the simple type commonly employed in microwave techniques, and means for providing a coupling between said waveguide and the gas delivery tube. Said means call for the use of attachments of a mechanical type which are quite simple and may consist of welding or any other type of assembly.

In order to obtain structures in which the impedance of the plasma flame is suitably matched with the waveguide impedance, it is advantageous to adopt complementary coupling means and in particular to place a metal sleeve around that portion of the gas delivery tube which emerges from the waveguide at the end nearest the discharge outlet, the transverse dimension of said sleeve being equal to or larger than that of the corresponding opening in the waveguide wall.

As has also been observed, it could prove beneficial to provide said waveguide with a second opening in the opposite side wall of the waveguide traversed by the tube and to place around said second opening a metal sleeve which extends around the rear portion of the tube. Said sleeve is provided in the vicinity of the end located opposite to the waveguide with a short-circuit having the function of reflecting towards the front portion of the tube the microwave energy which is transmitted by said waveguide to said sleeve. Preferably, the waveguide is in turn short-circuited beyond the gas delivery tube in the direction of propagation of the microwave energy.

In all cases, it may prove advantageous to make provision for longitudinal position-setting of the shortcircuit which reflects the energy transmitted to the end of the waveguide and/or the short-circuit which closes the sleeve surrounding the rear portion of the gas delivery tube. This adjustment makes it possible to achieve optimum matching of the impedance of the structure formed by the tube and the sleeves in the presence of the plasma with the impedance of the microwave supply.

It is thus possible to optimize the efficiency of propagation of the microwave energy transmitted to the tube, in the direction of the tube end, as well as the efficiency of conversion to plasma-generating energy. In this connection, the possibility of increasing to a considerable extent the energy transmitted to the end of the tube permits the attainment of very high plasma temperatures. Given the fact that, by making use of simple electronic control means and currently available microwave power generators, it is possible to vary the energy transmitted by the waveguide in proportions within the range of 1 to 100 over extremely short time intervals, it will accordingly be realized that the invention permits a very fast change in the temperature of a plasma flame to an extent hitherto unknown in practical applications. Furthermore, electronic control of the microwave source permits flame temperature regulation by negative feedback when a temperature sensor is placed on an object which is subjected to the action of said flame.

Finally, the fact that the invention makes it possible to increase the temperature of plasma flames represents an advantage when it is desired to produce gas mixtures, and especially mixtures in which at least one of the components is relatively difficult to ionize.

To this end, and according to a second aspect of the invention, there is provided a plasma torch device of the type comprising gas delivery means provided with at least one tube through which a gas can be circulated, an end portion of said tube being electrically conductive at least to a partial extent and provided with a gas discharge outlet, and means for supplying the tube with microwave energy. Said device is distinguished by the fact that said gas delivery means comprise at least a second tube associated with the first tube and preferably mounted within this latter in order to convey a flow of fluid such as another gas to the vicinity of said outlet independently of the flow carried by the first tube. Depending on the embodiment adopted, said second tube can be either of metal or of insulating material. Only the external portion of the first tube is electrically conductive in order to perform its function in the transmission of the electromagnetic energy which is supplied to said tube. By suitably choosing the second tube, it is therefore possible, for example, to transfer gases which have a corrosive action on metals. A remarkable fact in this connection is that, contrarily to a widely-held opinion, a plasma flame can be successfully and efficiently obtained with tube outlets of relatively large diameter.

Accordingly, the invention provides a number of methods for the utilization of a device as hereinabove defined. In accordance with a first method, the inner or central tube is supplied with a plasma-generating gas and the outer tube is supplied with a shielding gas. This accordingly makes it possible to isolate the plasma as it passes out of the tube by means of an annular gas stream which prevents any contact between the molecules of the plasma and the ambient air or even any other environmental atmosphere.

In accordance with a second method for the utilization of the aforementioned device, the outer tube is used for conveying a plasma-generating gas or in other words a gas which is relatively easy to ionize. Accordingly, the gas conveyed by the inner tube is necessarily enclosed as it passes out of this latter by the plasma which is produced. This gas can be caused to pass through the flame if the plasma-generating gas is intended to be discharged through one or a number of outlet orifices which are directed in such a manner as to form a convergent flame.

By proceeding in the manner just mentioned, it is possible to excite gases or fluids which usually present difficulties in regard to either handling or treatment. This procedure is advantageous, for example, in spectroscopy in order to produce flames.

According to yet another aspect of the invention, provision is also made for substantial heating of a fluid agent or of a flexible material such as a wire which is displaced at high speed within a tube whilst a plasma is produced at the end of said tube. This method is primarily applicable to devices for producing plasmas by microwave supply. The wire can travel within the plasma-generating tube or within another tube which is concentric with this latter. The surface of the wire can thus undergo a heat treatment.

According to a final aspect of the invention, there is provided a torch device of the general type described in the foregoing in which the gas delivery tube extends over a relatively long distance with respect to the supply unit from which the microwave energy is transmitted to the device. To this end, the invention provides an arrangement such that a tube of this type which is not necessarily of rectilinear shape is surrounded by a conductive sleeve with which it forms a structure for propagation of the microwave energy transmitted toward the gas discharge outlet. The sleeve itself is equipped with an impedance-matching device. In a preferred form of construction, said impedance-matching device can take the form of a conductive lateral portion of duct joined to the intermediate portion of the sleeve. Short-circuit means are provided within this lateral duct element in order to reflect the microwave energy received by said means. Especially when the gas delivery tube and its sleeve have a relatively substantial length such as several tens of centimeters, for example, the aforementioned lateral duct element permits impedance matching which is suited to optimum propagation of energy up to the end of the tube. To this end, arrangements can be made to adjust the position of the short-circuit within the lateral duct element.

By virtue of this possibility of increasing the length of the gas delivery tube which serves to create the plasma at the end of this latter, it becomes possible to produce the flame in locations which are not readily accessible while maintaining the high standard of efficiency mentioned earlier. In addition, the shape of the flame can also be adapted to special conditions of use. Thus it is possible in particular to produce flames which no longer have a circular cross-section but have an elongated cross-section such as flat flames, for example.

Other features of the invention will be more apparent to those versed in the art upon consideration of the following description and accompanying drawings, wherein:

Figure 1:
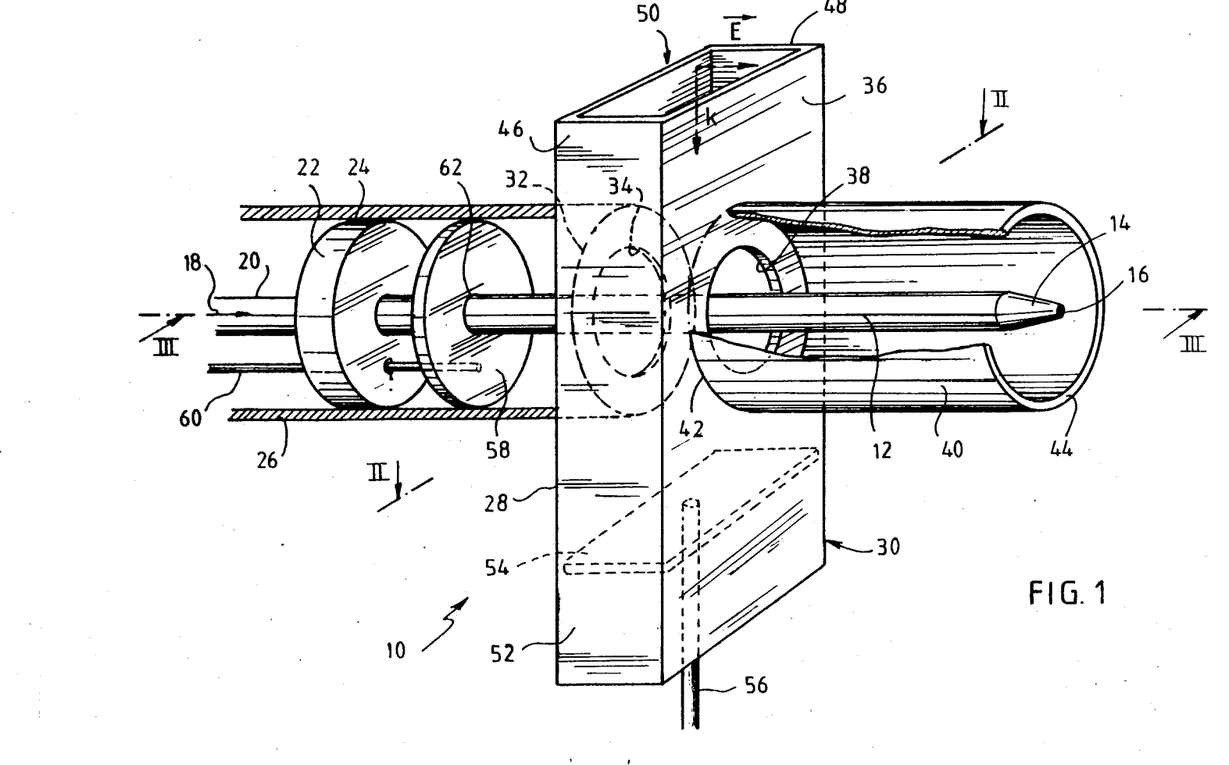
FIG. 1 is a fragmentary part-sectional view in perspective with portions broken away and showing a torch device in accordance with the invention.

A plasma torch 10 (as shown in FIG. 1) comprises a metal tube 12 of copper, for example, and having a tapered profile 14 at its front end. Said tube terminates in an outlet 16 for the discharge of gases admitted in the direction of the arrow 18 at the rear end 20 of said tube. At the end 20, the tube 12 is stationarily fixed in a centering disk 22, the peripheral portion 24 of which is fixed within a rigid metal sleeve 26 in such a manner as to ensure that the tube 12 and the sleeve 26 are in coaxial relation. In front of the centering disk 22, the sleeve 26 is joined in conductive contact to a side wall 28 of a rectangular waveguide 30 along a circular joint line 32. Within said joint line 32, the side wall 28 is pierced by a circular opening 34 which has a smaller diameter and is traversed coaxially by the tube 12. Said tube emerges from the rectangular waveguide 30 through a wall 36 which is opposite to the wall 28 and pierced by a circular opening 38 which has a larger diameter than the tube 12 and is coaxial with this latter.

Around the front portion of the tube 12, there is also mounted a cylindrical metal sleeve 40 which is joined in conductive contact to the front face 36 of the waveguide 30 along a circular joint line 42 which, in this example, has a larger diameter than the circular opening 38. The cylindrical sleeve 40 terminates at its front end 44 in a plane at right angles to the axis of the tube 12 and in the vicinity of the end of the outlet orifice 16 of this latter, said sleeve being fixed coaxially with respect to the tube 14.

The waveguide can be of a commercially available type for transmission in the transverse electric ($TE_{H01}$) mode. The walls 28 and 36 form the broad sides of its rectangular cross-section. The narrow sides of said cross-section are defined by two opposite walls 46 and 48. Said waveguide has an admission end 50 which is intended to be connected by conventional means to a microwave source (not shown in the drawings) in order to permit propagation of electromagnetic energy within said waveguide in the longitudinal direction of the tube (arrow k), the electric field E being oriented transversely to the direction k and parallel to the narrow sides 46 and 48 of the waveguide.

At the end of the tube 12 opposite to the admission end 50, the waveguide 30 has an end portion 52, a rectangular piston 54 being slidably mounted within said end portion and placed in electrical contact with the inner faces of the walls 28, 36, 46 and 48 of said waveguide 30. Said piston is capable of displacement in sliding motion within the waveguide, for example under the action of an operating rod 56. The piston 54 forms a short-circuit within the waveguide and causes the microwaves received by said piston to be reflected back towards the tube. The position-setting of the piston is thus one of the factors which permit impedance-matching of the system with a view to obtaining good efficiency of microwave energy transmission toward the radiating system formed by the tube 12 and the sleeve 40.

The structure formed by the metal sleeves 26 and 40 and the openings 34 and 38 in the broad walls of the waveguide ensures coupling of the energy transmitted by the waveguide to the tube 12. In the example shown in the drawings, provision has been made between the centering disk 22 and the broad wall 28 of the waveguide for a piston 58 which is coaxial with the tube 12 and capable of longitudinal positional displacement under the action of an operating rod 60 which passes through the centering disk 22. The entire periphery of the piston 58 is in conductive contact with the interior of the sleeve 26. The central portion of the piston 58 is pierced by an opening 62 which permits displacement of the piston in sliding motion along the tube 12 while maintaining electrical contact with this latter. Said piston forms a reflector for the waves admitted through the inlet 50 of the waveguide 30 and the opening 34. The position of the piston is so determined as to return the maximum amount of energy received toward the front portion of the tube 12.

During operation, the waveguide 30 can be connected to a microwave source of several kilowatts. The energy transferred by said waveguide causes excitation of the tube 12 which passes transversely through said waveguide, with the result that the front end 14 of the tube acts as an antenna for dissipating in the form of radiation all the energy which it receives. When a gas and especially a plasma-generating gas such as argon is admitted at the rear end 20 of the tube (as shown by the arrow 18), it is only necessary to produce a triggering spark at the discharge outlet 16 in order to initiate ionization in the exit gas. The ionized zone develops and is then self-maintained under the action of the microwave energy which is delivered to said zone by the tube 12. A plasma is formed and measurements have shown that practically the entire amount of microwave energy admitted at the waveguide inlet 50 is employed for creation and maintenance of said plasma, whereas overheating and spurious radiations are negligible. In particular, it is wholly evident that the generated plasma is localized in front of the discharge outlet 16.

In the embodiment hereinabove described, only the tube 12 passes transversely within the interior of the waveguide 30. The sleeves 40 and 26 are located outside the waveguide. Depending on the impedance-matching requirements of the system, the openings 38 and 34 may or may not have the same diameter as those of the corresponding sleeves. Similarly, the lengths and the diameters of the sleeves can be different and can vary according to the forms of construction adopted. In particular, although it has become apparent from tests performed by the Applicant that it is generally desirable to provide a front sleeve such as the sleeve 40, the presence of a rear sleeve 26 does not appear to be absolutely indispensable. The sleeve 40 can be extended beyond the discharge outlet 16 of the tube 12 in order to obtain a flame in an atmosphere of higher purity, for example.

Figure 2:
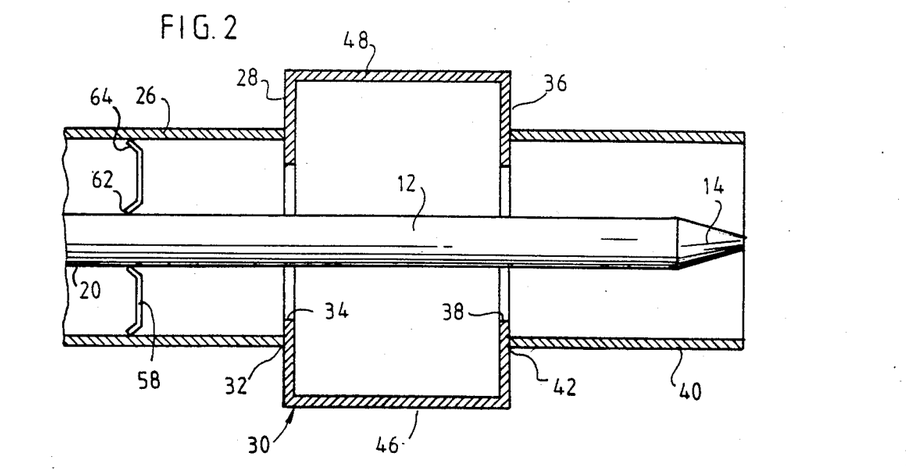
FIG. 2 is a schematic view of the torch, this view being taken in cross-section along the plane indicated by the arrows II in FIG. 1.

There are shown in FIG. 2 those portions of the impedance-matching piston 58 which are located at the edge of the axial opening 62 and at the periphery 64 of said piston. Said edge portions are bent backwards and are thus permitted by virtue of their inherent elasticity to maintain a good contact on the one hand with the tube 12 and on the other hand with the sleeve 26. By reason of the very high powers utilized by the embodiment in accordance with the invention, it may prove desirable in some instances, in order to prevent overheating and arcing, to replace the short-circuit 58 by a quarter-wave trap short-circuit as illustrated in FIG. 3.

Figure 3:
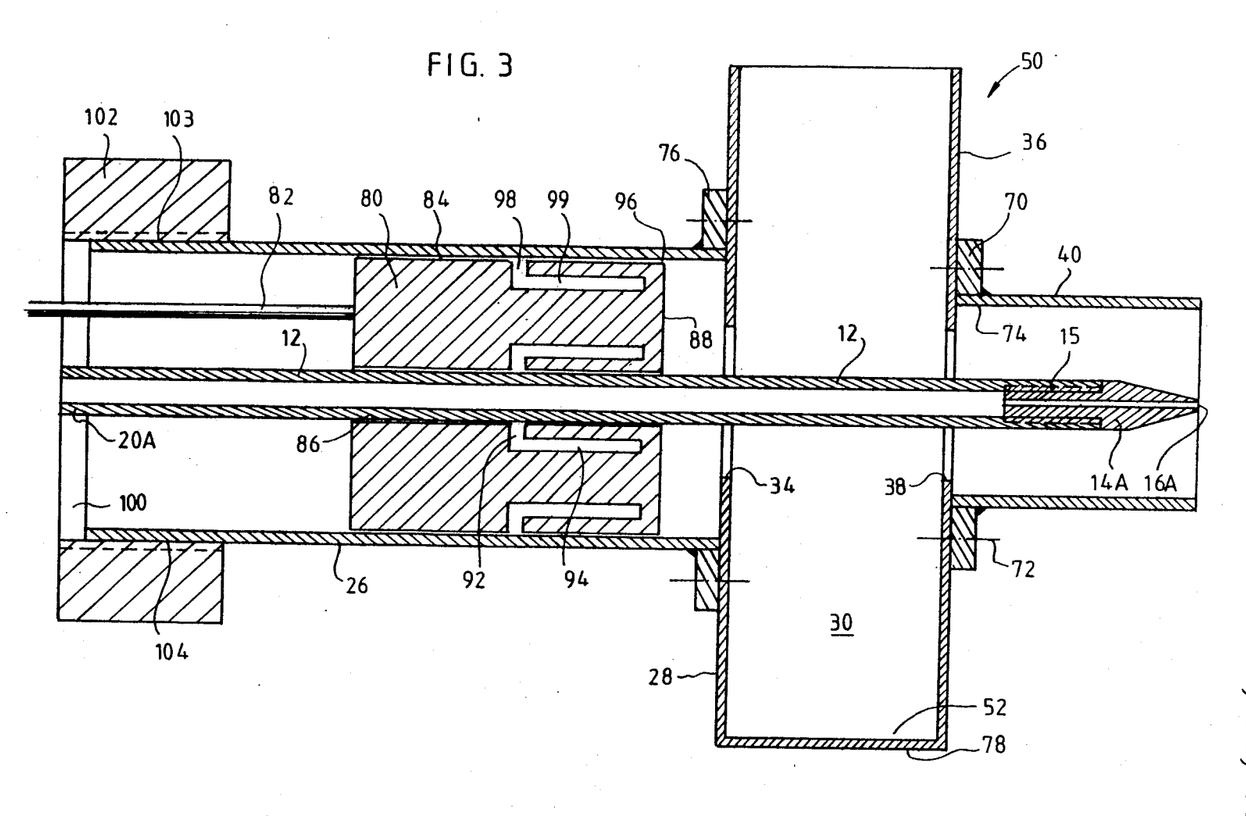
FIG. 3 is a view of an alternative embodiment of the torch of FIG. 1, this view being taken in cross-section along a plane indicated by the arrows III—III in FIG. 1.

In FIG. 3, the same reference numerals as in FIGS. 1 and 2 have been used to designate elements which remain unmodified. In the description which now follows, consideration will be given solely to the elements which have been modified or which are given complementary illustrations. For example, the tube 12 thus terminates in a detachable metallic or dielectric nozzle 14A which can be fixed at 15 within the tube 12 by screwing, for example. The discharge outlet 16A for the plasma-generating gas is formed at the end of the nozzle 14A. A sheet-metal ring 70 is secured in coaxial relation to the tube 12, for example by means of screws 72, against the external face of the wall 36 of the waveguide 30. The rear end 74 of the metal sleeve 40 is welded to the inner face of the ring 70. A similar ring arrangement 76 is employed for joining the front end of the metal sleeve 26 to the outer face of the waveguide wall 28. In the example of FIG. 3, the end portion 52 of said waveguide is closed by a fixed end wall 78.

Provision is made within the sleeve 26 for a quarter-wave trap 80 having the shape of an annular plug and capable of longitudinal displacement. Said quarter-wave trap can be mounted, for example, by means of one or a number of rods such as the rod 82. The design function of said rods is to maintain the outer side wall 84 and the inner side wall 86 of the trap 80 at a short distance respectively from the inner wall of the sleeve 26 and the outer wall of the tube 12 without being applied in contact with said walls. The trap or plug 80 has a flat annular face 88 which is directed towards the opening 34 in the waveguide 30. There is permitted to remain at the inner edge of said face 88 a thin annular gap 90 which communicates around the entire periphery of the tube 12 with a circular passage 92 having a radial direction and formed in the central portion of the plug 80. Said passage in turn communicates with an annular well 94 bored coaxially with the tube 12 in the direction of the front face 88 and up to the vicinity of this latter. The length chosen for said annular well 94 is equal to one-fourth of the transmitted wavelength in order to ensure that all the energy is reflected.

A similar structure is provided for the energy discharged at the external periphery of the surface 88 via an annular gap 96 between the sleeve 26 and the periphery of the plug 80, a radial passage 98 being provided in order to communicate with an annular well 99 which is also dimensioned so as to correspond to one-fourth of the wavelength to be trapped.

In the example of FIG. 3, there is also shown the assembly of the rear end 20A of the tube 12 against a circular centering disk 100, said disk being rigidly fixed to a ring 102 provided with an internal screw-thread 103 which is adapted to cooperate with an external screw-thread 104 on the end portion of the sleeve 26. Rotational displacement of the ring 102 permits accurate adjustment of the longitudinal position of the discharge outlet 16A of the tube 12. The rods 82 are slidably fitted within the centering disk 100.

In one example of construction, the waveguide 30 transmits energy in the TE$_{01}$ mode at a frequency of 2450 MHz with a power which can be modulated between 100 watts and 5 kilowatts. Measurements have shown that the efficiency remains higher than 90% in all cases. The corresponding temperature variation of the flame can vary within the range of 1200° C. to 5000° C. and even 6000° C.

The dimensions of the waveguide in this example are, in transverse cross-section: 43 mm×86 mm.

The length of the tube 12 is approximately 235 mm.

The length of the front sleeve 40 is approximately 50 mm.

The diameter of the opening 38 for transferring energy from the waveguide to the front end of the tube 12 is 32 mm.

The external diameter of the tube 12 is 10 mm and the internal diameter of the discharge outlet 16 A within the interior of the nozzle 14A is 2 mm.

The internal diameter of the sleeve 40 is 40 mm.

The rate of flow of gas (argon) can be less than 1 liter per minute.

The dimensions of the metal sleeve 26 are as follows:

length: approximately 140 mm,
internal diameter: approximately 60 mm,
diameter of the opening 34:32 mm.

There has thus been obtained an extremely simple assembly for generating plasmas which call for relatively considerable powers. Practical tests have shown in particular that, by means of a waveguide of the type mentioned in the foregoing, the range of powers transmitted could be varied to the extent indicated and that no loss of efficiency has been found in practice. By means of this device, it is therefore possible to produce considerable energy densities and to vary these densities within very short time intervals. These properties are particularly useful when it is sought to treat gases which cannot readily be ionized and which consequently require very high temperatures for this purpose. The possibility of obtaining very high energy densities is also of great value in surface treatment operations.

The structure described in the foregoing with reference to FIGS. 1 to 3 lends itself to particularly remarkable variants in certain areas of use.

Figure 4:
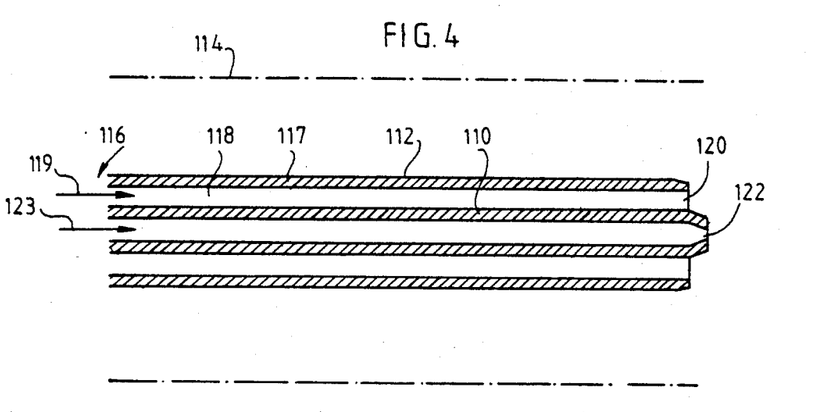
FIG. 4 is a scnematic illustration of tne construction of a portion of the torch in an alternative embodiment, this view being taken in longitudinal cross-section along a diametral plane of the tube.

FIG. 4 shows two coaxial gas delivery tubes, namely a tube 110 at the center and a tube 112 at the periphery. Said delivery tubes are mounted coaxially within the interior of a metal sleeve 114 shown in chaindotted lines. The tubes are connected to a microwave excitation structure (not shown) located in the vicinity of one of their ends 116. In particular, said structure can be formed essentially by a waveguide as designated by the reference 30 in FIGS. 1 to 3. Said waveguide is provided with a suitable opening 38 in order to permit discharge of the microwave energy. The tube 112, or at least its external surface 117, is of metal. Said tube defines with the tube 110 an annular passage 118 within which a first gas can be transferred (as shown by the arrow 119) in the direction of its front end 120 which is provided with an annular orifice or with a plurality of holes disposed on a circle for the discharge of gas.

Figure 5:
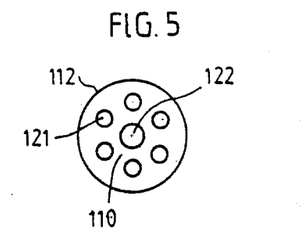
FIG. 5 is an end view of an alternative embodiment of the torch of FIG. 4.

In FIG. 5, there is shown the front face of a combination of tubes of the type illustrated in FIG. 4. The end of the tube 112 is closed by a partition-wall pierced by a series of holes 121 disposed in spaced relation on a circle which is centered on the common axis of the tubes 110 and 112. The tube 110 terminates in a hole 122.

The tube 110 can also be of metal. However, this is not indispensable. In fact, the electromagnetic energy may be transmitted to the plasma formation zone at the front end of the tubes 110 and 112 solely along the external surface of the tube 112.

The device of FIG. 4 is of considerable practical interest in that it permits the use or formation of a plasma by making several fluid media take part in the process instead of a single gas as considered earlier.

In accordance with a first method, the inner tube 110 is supplied with a plasma-generating gas such as argon, for example, which is admitted at the rear end of the tube as indicated by the arrow 123. A shielding gas such as helium is admitted into the annular gap 118 in the direction of the arrow 119. As it passes out of the end 120 of said tube, the helium or other shielding gas forms a tubular gas stream which surrounds the ionized particles constituting the plasma flame at the outlet 122 of the tube 110, namely over a distance which may be relatively considerable. A gas stream of this type can be obtained by means of a limited flow of gas within the annular gap 118 while providing the plasma flame with highly effective protection against sources of pollution or undesirable reagents.

Figure 6:
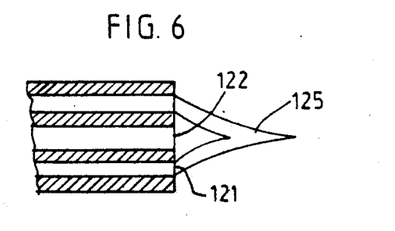
FIG. 6 illustrates a possible mode of operation of said alternative embodiment.

In another method of utilization, the plasma-generating gas such as argon is admitted into the annular gap 118 and the central tube 110 is employed for delivering another gas or another fluid material which it is desired to subject to the action of the plasma at the outlet 122 of said tube. In order to facilitate this interaction, steps can also be taken to orient the holes 121 in order to form a flame 125 which is convergent (as shown in FIG. 6) as it passes out of the plasma-generating tube 112. Any agent which reaches the end 122 of the tube 110 is then constrained to pass through the flame 125.

This arrangement makes it possible to contemplate a large number of potential applications. In particular, it proves useful for spectrum analysis of any gas since the plasma makes it possible to ensure excitation of said gas in a highly efficient manner.

The method just described is also advantageous in surface treatment applications, for example when making use of gases such as halogens or halides in particular since the excitation of these gases is usually difficult to obtain. The arrangement considered is also of interest in oxyacetylene cutting in which oxygen is driven through the plasma via the central tube.

The central tube 110 can be formed of material other than metals. In particular, when the second gas, or doping gas, produces a corrosive action on metals as is the case in particular with chlorine or fluorine, the system operates with a central tube which affords chemical resistance to the gas being transported and which is formed of non-conducting material.

It is also possible to admit through the central tube 110 any agent or material which is capable of moving through the discharge outlet 122, especially with a view to producing a very fast temperature rise. Thus it follows, for example, that this device can be employed for subjecting a thread of synthetic material traveling at high speed to a temperature rise which is sufficient to modify its plasticity but not, however, to affect its chemical structure.

As can readily be understood, the power transferred at microwave frequencies is made proportional to the rate of flow of gas admitted into the tubes 110 and 112. In one example of construction, a plasma has been produced from a gas discharged through an orifice 122 having a diameter of 2 mm and surrounded by a gas-flow shield at the exit of an annular orifice 120 having an internal diameter of 4 mm and an external diameter of 6 mm. In another example, a convergent plasma flame has been produced by means of eight orifices 121 having a diameter of 1 mm and disposed in spaced relation on a circle having a diameter of 8 mm around a central orifice 122 which had a diameter of 4 mm and through which the flame was supplied with a doping gas. It is readily apparent that the practical application of the invention is not limited solely to the case of two concentric tubes.

Under certain circumstances, it is useful to have the possibility of directing a flame into a location which is difficult to reach and/or to endow the flame with a particular shape which is not necessarily cylindrical.

Figure 7:
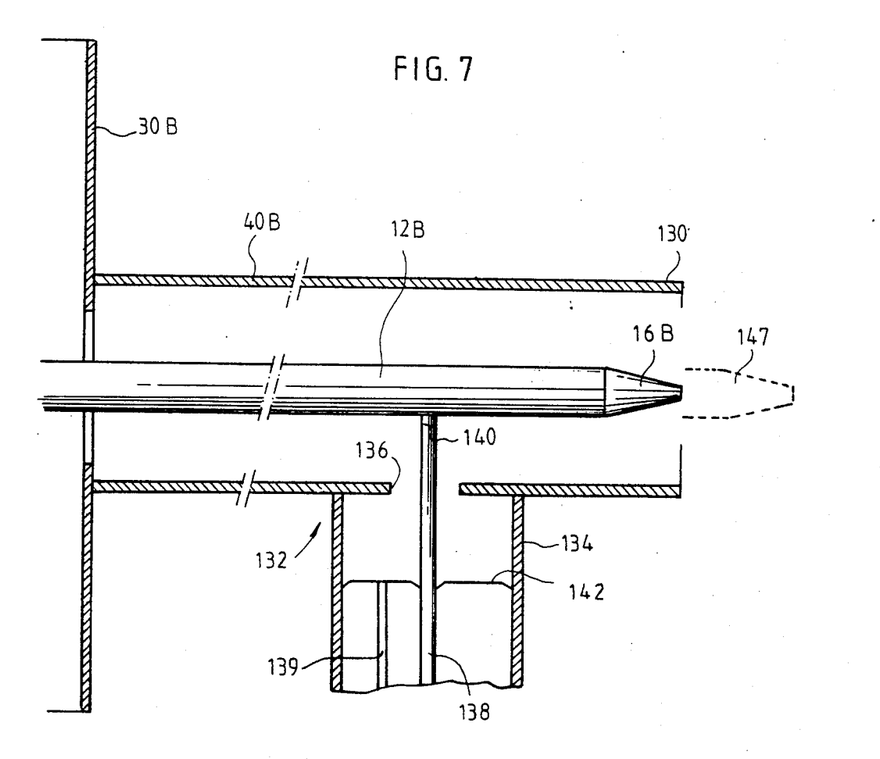
FIG. 7 illustrates a third alternative embodiment of the torch in accordance with the invention.

FIG. 7 illustrates the end portion of a torch of the type described with reference to FIGS. 1 to 3 in which the gas delivery tube 12B is substantially increased in length compared with the examples mentioned earlier. In the example now considered, the delivery tube can attain a length of several tens of centimeters, for example, in contrast to a length of only a few centimeters in the cases contemplated in the foregoing. Said tube 12B is surrounded by a sleeve 40B which projects in front of the waveguide 30B. The sleeve 40B extends to the vicinity of the outlet 16B of the tube 12B (extremity 130). In order to ensure perfectly matched transmission of microwave energy along the system consisting of tube 12B and sleeve 40B, provision is made for an additional impedance-matching device 132. This device is designed in the form of a lateral metallic duct element 134, one end of which is in conductive contact with the outer surface of the sleeve 40B around an opening 136 at an intermediate point in the side wall of said sleeve. In the axis of the duct element 134 is mounted a rod 138 which is in electrical contact with the outer face of the tube 12B at the point 140. A microwave short-circuit 142 is slidably mounted within the duct element 134 and around the rod 138. Said short-circuit can be designed in the form of a stationary or movable piston, or in the form of a quarter-wave trap as mentioned earlier and displaced by means of a rod 139. It has also been found that a lateral impedance-matching device of this type permits the further possibility of extending the end portion of the tube 12B to a point located beyond the extremity 130 of the sleeve 40B (as shown by the dashed outline 147) while nevertheless retaining the desired properties of high efficiency.

It has been observed in addition that, by virtue of a lateral impedance-matching device such as the device 132, it is also possible to modify the shape of the tube 12B in order to produce non-cylindrical flame configurations.

Figure 8:
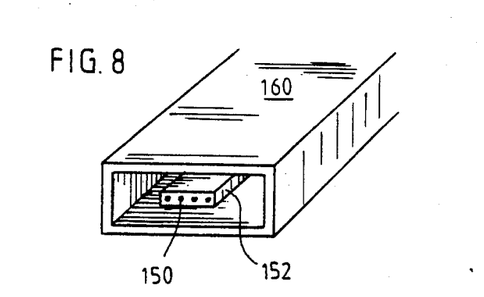
FIG. 8 is a view in perspective showing the end of a torch in accordance with the invention, in yet another embodiment.

There is shown in FIG. 8 an extremity 150 of a tube 152 of rectangular cross-section through which a plasma-generating gas is discharged via one or a number of orifices in order to form a substantially flat flame. The tube 152 is surrounded by a conductive metal sleeve 160, also of rectangular shape and intended to perform a function which is similar to the sleeve 40B of FIG. 7, said sleeve 160 being provided with an impedance-matching device such as the device 132.

In all the examples considered thus far, it has been assumed that the torch in accordance with the invention made it possible to produce a plasma flame in an environment at atmospheric pressure. This is an advantage in a very large number of practical applications. Tests have shown, however, that it is also possible to operate at ambient pressures as high as several atmospheres while still maintaining the application of the principles in accordance with the invention.

What is claimed is:
1. A plasma torch of the type comprising means for supplying microwave energy, gas delivery means comprising at least one tube for the flow of gas having an end portion which is electrically conductive at least to a partial extent and provided with a gas discharge outlet, and means providing a coupling between said microwave energy supply means and said tube, wherein said microwave energy supply means comprises a waveguide having a microwave input end, walls and a terminal short-circuit opposed to the microwave input end, and said coupling means comprises first and second openings made within said walls of the waveguide,
said end portion of the tube passing through said two openings, and the first one of said openings being located on the side nearest the gas discharge outlet having a dimension larger than the transverse dimension of the tube.

2. A torch according to claim 1, wherein the tube passes through the waveguide from one side to the other and transversely with respect to the direction of propagation of energy within said waveguide.

3. A torch according to claim 2, wherein said waveguide has a rectangular cross-section.

4. A torch according to claim 1, wherein the waveguide is short-circuited at the end opposite to the admission of microwave energy with respect to said tube.

5. A torch according to claim 1, wherein the coupling means further comprises a metal sleeve around that portion of the tube which is located nearest the gas discharge outlet, said metal sleeve being electrically connected with the adjacent waveguide side wall.

6. A torch according to claim 5, wherein the transverse dimension of said metal sleeve is larger than the first opening in said waveguide.

7. A torch according to claim 5 wherein said coupling means further comprises another metal sleeve placed around said tube at the end remote from said discharge outlet with respect to said waveguide, and being electrically connected with the adjacent waveguide side wall, the interior of said other sleeve being adapted to communicate with the interior of the waveguide through said second opening, which has a transverse dimension which is larger than that of the tube.

8. A torch according to claim 3, wherein said opening transvered by the tube is formed in a broad face of the rectangular-section waveguide.

9. A torch according to claim 5, wherein the sleeve which surrounds the portion of tube located nearest the discharge outlet has a length substantially equal to that of said portion of tube.

10. A torch according to claim 1, wherein said gas delivery means comprises at least two tubes at least one of which is at least partially electrically conductive.

11. A torch according to claim 10, wherein the second tube is mounted within the interior of the first tube.

12. A device according to claim 11, wherein said second tube is formed a of material having low electrical conductivity.

13. A device according to claim 11 or claim 12, wherein the discharge outlet of the first tube is shaped in such a manner as to result in formation of a convergent jet substantially in the axis of the discharge outlet of the second tube.

14. A torch according to claim 13, wherein the inner tube is supplied with a plasma-generating gas and the outer tube is supplied with a shielding gas.

15. A torch according to claim 13, wherein the outer tube is supplied with a plasma-generating gas and the inner tube is supplied with anoher material.

16. A torch according to claim 5, wherein said metal sleeve has impedance-matching means being provided laterally along said sleeve.

17. A torch according to claim 16, wherein said impedance-matching means comprise a conductive duct element terminating in an opening formed in said sleeve, said duct element being fitted with a central rod connected to the tube and being closed by a short-citcuit at the end opposite to said sleeve.

18. A torch according to claim 1, claim 16 or claim 17, wherein the transverse cross-section of said tube is of non-circular shape.

19. A torch according to claim 3, wherein said waveguide operates in an electric transverse mode, with the electric field direction being parallel with the smaller sides of the said rectangular cross-section thereof.

20. A torch according to claim 1, wherein said terminal short circuit is movable.

21. A torch according to claim 7, wherein said other sleeve is short-circuited at a selected distance from said second opening.

22. A torch according to claim 7 wherein said other sleeve comprises a quarter-wave trap at a selected distance from said second opening.

23. A torch according to claim 1, wherein the gas discharge outlet of the tube is longitudinally movable.

24. A torch according to claim 10, wherein said two tubes supply to respective gas streams within one and the same plasma-formation zone.

* * * * *

UNITED STATES PATENT AND TRADEMARK OFFICE
CERTIFICATE OF CORRECTION

PATENT NO. : 4,611,108
DATED : September 9, 1986
INVENTOR(S) : Philippe Leprince, Emile Bloyet and Jene Marec It is certified that error appears in the above-identified patent and that said Letters Patent is hereby corrected as shown below:

Assignee: "(ANUAR)" should be --ANVAR--.

Column 1, line 8, "application Ser." should be --Patent--.

Column 4, line 52, "tne" should be --the--.

Column 6, line 26, "gencrated" should be --generated--.

Column 12, line 2, after "formed a of" should be --formed of a--.

Column 12, line 23, "short-citcuit" should be

--short-circuit--.

Signed and Sealed this

Second Day of December, 1986

*Attest:*

DONALD J. QUIGG

*Attesting Officer*  *Commissioner of Patents and Trademarks*